United States Patent
Kirchmeyer et al.

(10) Patent No.: US 6,224,946 B1
(45) Date of Patent: May 1, 2001

(54) SUSPENSIONS, A PROCESS FOR THEIR PREPARATION, AND THE USE THEREOF

(75) Inventors: Stephan Kirchmeyer, Leverkusen; Markus Mechtel, Köln; Michael Mager, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/317,528

(22) Filed: May 24, 1999

(30) Foreign Application Priority Data

May 29, 1998 (GB) ............................................. 198 24 187

(51) Int. Cl.$^7$ ..................................................... C08L 83/06
(52) U.S. Cl. .............................. 427/387; 528/37; 528/15; 528/32; 556/458; 556/464; 524/837
(58) Field of Search .............................. 524/837; 528/37, 528/15, 32; 556/458, 464; 427/387

(56) References Cited

U.S. PATENT DOCUMENTS

| | | | |
|---|---|---|---|
| 5,359,109 | * | 10/1994 | Ritscher et al. . |
| 5,378,790 | * | 1/1995 | Michalczyk et al. . |
| 5,677,410 | | 10/1997 | Mager et al. ............................ 528/15 |
| 5,861,458 | * | 1/1999 | Naganawa et al. . |
| 6,005,131 | * | 12/1999 | Jentsch et al. . |

FOREIGN PATENT DOCUMENTS 196 03 241    7/1997 (DE) .

* cited by examiner

*Primary Examiner*—Robert Dawson
*Assistant Examiner*—Kuo-Liang Peng
(74) *Attorney, Agent, or Firm*—Joseph C. Gil; Thomas W. Roy

(57) ABSTRACT

This invention relates to novel suspensions containing
(a) 30 to 95 wt. % of water,
(b) 70 to 5 wt. % of at least one silane or siloxane having at least two groups corresponding to formula (I)

$$-(CH_2)_m SiR_n X_{3-n} \qquad (I)$$

wherein
R denotes $C_1$–$C_{18}$ alkyl and/or $C_6$–$C_{20}$ aryl,
X denotes OH, $C_1$–$C_4$ alkoxy, $C_6$–$C_{20}$ aryloxy, $C_1$–$C_6$ acyloxy and/or hydrogen,
m is 1 to 6, and
n is 0 to 2,
(c) 0.1 to 30 wt. % of at least one emulsifier, and
(d) 0 to 20 wt. % of one or more additives and/or auxiliary substances,
with the proviso that the sum of components (a) to (d) totals 100 wt. %. The present invention further relates to the preparation and use of such suspensions.

7 Claims, No Drawings

SUSPENSIONS, A PROCESS FOR THEIR PREPARATION, AND THE USE THEREOF

BACKGROUND OF THE INVENTION

The present invention relates to novel suspensions and their preparation and use.

The demands placed on modem lacquer binders include high hardness with at the same time high elasticity, good weather resistance and chemical resistance as well as a possibly low emission of volatile organic substances during application and curing. Meanwhile, water-based organic binders are highly developed; lacquer systems based on acrylate, polyester and polyurethane are used in the lacquering of wood, for example, in furniture lacquering as well as metals and plastics, for example, in the lacquering of automobiles, railway vehicles, ships and in industrial lacquering. Aqueous binders based on polyorganosilicones are also known. Because of their chemical structure, silicones substituted with methyl groups in particular have an outstanding weather resistance and water repellency. Their water repellency in particular renders them efficient constituents of paints, for example, on the exteriors of buildings.

Multifunctional carbosilanes, which are described in DE-A 19,711,650 and DE-A 19,603,241, are also suitable coating materials. Such compounds combine the hardness and elasticity of high-quality organic lacquer binders with the high weather resistance and low tendency to yellowing of methylsilicones. But the processing of multifunctional carbosilanes is subject to difficulties. Thus it has not been possible to use them as binders in aqueous lacquer formulations. Moreover, prior to application these binders have had to be aged in solvent-containing catalyst formulations and then processed within a certain period of time.

The object of the present invention was to provide aqueous suspensions (dispersions or emulsions) which are based on these carbosilanes and are stable in storage.

It has now been found that the object stated above could be achieved using suspensions (emulsions or dispersions) according to the invention, when these contain particular siloxanes or silanes, emulsifiers, and optionally conventional additives and auxiliary substances in particular proportions in water. This is surprising, as those skilled in the art would have to assume that these multifunctional carbosilanes or siloxanes in water would become unusable in time, owing to progressive hydrolysis and condensation reactions. The suspensions according to the invention nevertheless exhibit a very high stability in storage.

For the purpose of this invention, the term "suspensions" includes emulsions as well as dispersions.

SUMMARY OF THE INVENTION

The invention accordingly provides suspensions comprising
(a) 30 to 95 wt. % (preferably 50 to 80 wt. %) of water,
(b) 70 to 5 wt. % (preferably 60 to 30 wt. %) of at least one silane or siloxane having at least two groups corresponding to formula (I)

$$—(CH_2)_m SiR_n X_{3-n} \quad (I)$$

wherein
R denotes $C_1$–$C_8$ alkyl or $C_6$–$C_{20}$ aryl (preferably $C_1$–$C_8$ alkyl),
X denotes OH, $C_1$–$C_4$ alkoxy, $C_6$–$C_{20}$ aryloxy, $C_1$–$C_6$ acyloxy, or hydrogen (preferably OH, methoxy, or ethoxy),
m is 1 to 6, (preferably 2 or 3) and
n is 0 to 2,
(c) 0.1 to 30 wt. % (preferably 0.5 to 10 wt. %) of at least one emulsifier, and
(d) 0 to 20 wt. % (preferably 0 to 2 wt. %) of one or more additives and/or auxiliary substances,
with the proviso that the sum of components (a) to (d) totals 100 wt. %.

In a preferred embodiment of the invention, the silane, which has at least two groups corresponding to formula (I), is a compound corresponding to formula (II)

$$R_{4-p}Si[O_t(CH_2)_m SiR^1_n X_{3-n}]_p \quad (II)$$

wherein
t is 0 or 1,
p is 4, 3, or 2 (preferably 4),
m is 1 to 6 (preferably 2 or 3),
n is 0 to 2,
R denotes $C_1$–$C_{18}$ alkyl and/or $C_6$–$C_{20}$ aryl (preferably $C_1$–$C_8$ alkyl),
$R^1$ denotes unsubstituted $C_1$–$C_{18}$ hydrocarbon (preferably methyl or ethyl) or a $C_1$–$C_{18}$ hydrocarbon which contains at least O, N, S, or P (preferably methoxyethyl), with each $R^1$ within the molecule being identical or different, and
X denotes OH, $C_1$–$C_4$ alkoxy, $C_6$–$C_{20}$ aryloxy, $C_1$–$C_6$ acyloxy, and/or hydrogen (preferably OH, methoxy, or ethoxy).

Compounds corresponding to formula (II) are prepared preferably by hydrosilylation of the corresponding vinyl, allyl, or higher alkenyl compounds with correspondingly functionalized silanes bearing H-Si-groups or siloxanes with correspondingly functionalized silanes bearing vinyl, allyl or higher alkenyl groups.

In other embodiments of the invention, the siloxane contains at least two structural units selected from M, D, and T units and optionally also Q units and/or its condensation products and/or partial condensation products. In the nomenclature familiar to the person skilled in the art, M denotes $R_3SiO_{1/2}$, D denotes $R_2SiO_{2/2}$, T denotes $RSiO_{3/2}$, Q denotes $SiO_{4/2}$, and R has the meanings given above.

Here, the siloxane has a preferred molecular weight (number average) of from 308 to 5,000.

In another preferred embodiment of the invention, the siloxane has the formula (III)

(III)

wherein a is 3 to 6 (preferably 4), or corresponds to its condensation products or partial condensation products, all other indices n, m, R, and X having the meanings already given above.

Particularly preferred siloxanes are

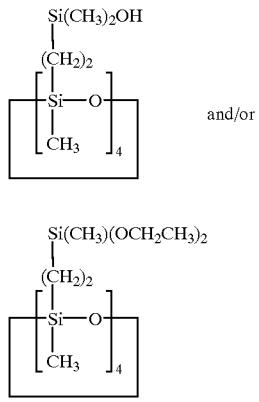

and/or their condensation products or partial condensation products.

Compounds corresponding to formula (III) (e.g., of formulas (IIIa) and (IIIb)) are preferably prepared by the process described in DE-A 19,603,241 or DE 19,711,650, by hydrosilylation of the corresponding vinyl compound with a chlorosilane and subsequent hydrolysis or alcoholysis.

For the purpose of this invention, condensation products and partial condensation products mean those compounds that are formed, for example, through reaction of two groups corresponding to the general formula (1), with splitting off of water or alcohol.

For the purpose of this invention, emulsifiers (c) are preferably anionic, cationic, or neutral low-molecular, oligomeric or polymeric emulsifiers, surfactants, or protective colloids.

Examples of anionic low-molecular, oligomeric, or polymeric emulsifiers or surfactants are alkali metal salts or alkaline-earth salts of fatty acids, for example, sodium salts of saturated fatty acids having 10 to 21 carbon atoms, sodium salts of unsaturated fatty acids having 12 to 18 carbon atoms, alkyl ether sulfonates, such as ethers of α-sulfo-ω-hydroxypolyethylene glycols with, for example, 1-methylphenylethylphenol, nonylphenol or alkyl ethers having 12 to 18 carbon atoms, arylalkyl sulfonates such as, for example, naphthalenesulfonic acids provided with straightchain or branched butyl groups, or alkyl sulfates, such as the sodium salts of long-chain alkyl sulfate esters.

Examples of cationic low-molecular, oligomeric, or polymeric emulsifiers or surfactants are the salts of amines bearing long-chain alkane groups having 8 to 22 carbon atoms in which the amines have been converted to the ammonium compounds with acids or by alkylation, as well as similar phosphorus compounds and sulfur compounds.

Examples of nonionic oligomeric or polymeric emulsifiers or surfactants are alkyl polyglycol ethers or alkyl polyglycol esters, such as ethoxylated long-chain alcohols having, for example, 12 to 18 carbon atoms, containing saturated or unsaturated bonds, ethoxylated castor oil, ethoxylated (coconut) fatty acids, ethoxylated soy bean oil, ethoxylated resin acids or rosin acids, ethoxylated and optionally propoxylated butyl diglycol, ethoxylated alkyl aryl ethers, such as ethoxylated straight-chain and/or branched nonylphenol or octylphenol or benzylated p-hydroxybiphenyl, ethoxylated tri- and diglycerides and alkyl polyglycosides.

Also suitable as emulsifiers or surfactants are ethoxylated long-chain alkylamines or alkenylamines, lecithin, reaction products of polyethylene glycols and diisocyanates modified by long-chain alkyl isocyanates, reaction products of rapeseed oil and diethanolamine or ethoxylated reaction products of sorbitan and long-chain alkanecarboxylic acids or alkenecarboxylic acids.

So-called protective colloids such as polyvinyl alcohols or water-soluble cellulose derivatives such as methyl cellulose, are also suitable.

Appropriate additives and auxiliary substances (d) are preferably age-resisters, bactericides, fungicides, lubricants, flow-control agents, wetting and dispersing agents, antioxidants, pH stabilizing agents such as amines, for example, ethanolamine, diethanolamine, triethanolamine, dibutylamine, ammonium acetate, sodium acetate and potassium acetate, solvents, for example, alcohols such as methanol, ethanol, n-propanol, isopropanol and butanol, ketones such as acetone and butanone, esters such as butyl acetate and methoxypropyl acetate, aromatic solvents such as toluene and xylene, and aliphatic solvents such as hexane, white spirit, and the like.

The invention also provides a process for preparing the suspension according to the invention or suspension, in which components (b), (c) and optionally (d) are added to water (a) and then emulsified or dispersed.

The emulsification or dispersion of components (a) to (d) is carried out, for example, by introducing energy, for example, by shaking, beating, stirring, turbulent mixing, injection, vibration, and cavitation in the mixture, for example, by ultrasound, using colloid mills, homogenizers, or jet dispersers. The composition according to the invention is prepared preferably in multiple steps by mixing portions of component (a) and components (b) to (d) in a vessel with stirring, then adding the rest of component (a), and subsequently treating the resulting suspension in a unit that is suitable for the introduction of high energy, preferably by means of homogenizers and jet dispersers. The emulsification process is known to those skilled in the art and is described, for example, in: Römpp "Chemie-Lexikon", Editors, J. Falbe and M. Regitz, G. Thieme Verlag, Stuttgart, New York, Volume 2, 1158 ff.

The invention also provides the use of the suspension according to the invention or suspension as coating agents and impregnating agents.

The following examples further illustrate details for the preparation of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all percentages are percentages by weight.

EXAMPLES

In all Examples the particle sizes were determined by means of light scattering.

Example 1

242.4 g deionized water (a) was placed in a two-liter stirred reactor equipped with anchor mixer and heated to 50° C. An emulsifier mixture (c) consisting of 34.33 g polyoxyethylene triglyceride (emulsifier Atlas G-1300 from ICI) and 15.67 g oxyethylated tridecyl alcohol (emulsifier Renex 36 from ICI) heated to 80° C. was added to the reactor and stirred for 15 minutes at a stirrer speed of 1000/minute. The mixture was cooled to 23° C. and 2.0 g of fungicide (d) (Preventol D2 from Bayer AG, Germany) was added thereto. 1000.0 g of a solution of 75 wt. % of a siloxane mixture (b) consisting of approximately 50 wt. % of the compound corresponding to formula (IIIa) and 50 wt. % of its higher condensates and 25 wt. % n-butanol (d) was added dropwise, with stirring, to the mixture, and stirring was continued for 30 minutes. 705.6 g of water was then added dropwise and stirring was continued for a further 30 minutes. The resulting suspension was subsequently emulsified using a jet disperser at a total pressure of 200 bar in one operation. The product obtained was a finely divided suspension that was stable for more than 6 months and had a solids content of 40.1% and an average particle size of 0.37 µm.

Example 2

90.9 g deionized water (a) was placed in a one-liter stirred reactor equipped with anchor mixer and heated to 50° C. An emulsifier mixture (c) consisting of 17.16 g polyoxyethylene triglyceride (emulsifier Atlas G-1300 from ICI) and 7.84 g oxyethylated tridecyl alcohol (emulsifier Renex 36 from ICI) heated to 80° C. was added to the reactor and stirred for 15 minutes at a stirrer speed of 1000 revs/minute. The mixture was cooled to 23° C. and 1.0 g of fungicide (d) (Preventol D2 from Bayer AG, Germany) and 5.0 g of diethanolamine (d) were added thereto. 500.0 g of a siloxane mixture (b) consisting of the compound corresponding to formula (IIIb) mixed with its higher condensates was added dropwise with stirring to the mixture, and stirring was continued for 30 minutes. 378.1 g of water was then added dropwise and stirring was continued for a further 30 minutes. The resulting suspension was subsequently emulsified using a jet disperser at a total pressure of 500 bar in one operation. The product obtained was a finely divided suspension that was stable for more than 6 months and had a solids content of 53.1% and an average particle size of 0.50 µm.

Example 3

116.3 g deionized water (a) was placed in a one-liter stirred reactor equipped with anchor mixer and heated to 50° C. An emulsifier mixture (c) consisting of 20.9 g polyoxyethylene triglyceride (emulsifier Atlas G-1300 from ICI) and 4.10 g oxyethylated tridecyl alcohol (emulsifier Renex 36 from ICI) heated to 80° C. was added to the reactor and stirred for 15 minutes at a stirrer speed of 1000 revs/minute. The mixture was cooled to 23° C. and 1.0 g of fungicide (d) (Preventol D2 from Bayer AG, Germany) and 5.0 g of diethanolamine (d) were added thereto. 500.0 g of 1,3,5,7-tetramethyl- 1,3,5,7-(methoxydimethylsilylethyl) cyclotetrasiloxane mixed with its higher condensates (b) was added dropwise, with stirring, to the mixture, and stirring was continued for 30 minutes. 352.7 g of water (a) was then added dropwise and stirring was continued for a further 30 minutes. The resulting suspension was subsequently emulsified using a jet disperser at a total pressure of 500 bar in one operation. The product obtained was a finely divided suspension that was stable for more than 6 months and had a solids content of 52.6% and an average particle size of 1.60 µm.

What is claimed is:

1. A suspension comprising (a) 30 to 95 wt. % of water,
   (b) 70 to 5 wt. % of at least one silane or siloxane wherein the silane is a compound corresponding to formula (II)

wherein t is 0 or 1, p is 4, 3, or 2, m is 1 to 6, n is 0 to 2,

R denotes $C_1$–$C_{18}$ alkyl or $C_6$–$C_{20}$ aryl, $R^1$ denotes unsubstituted $C_1$–$C_{18}$ hydrocarbon or a $C_1$–$C_{18}$ hydrocarbon which contains at least O, N, S, or P, with each $R^1$ being identical or different, and X denotes OH, $C_1$–$C_4$ alkoxy, $C_6$–$C_{20}$ aryloxy, $C_1$–$C_6$ acyloxy, or hydrogen, and wherein the siloxane has the formula (III)

wherein a is 3 to 6, n is 0 to 2, m is 1 to 6,

R is $C_1$–$C_{18}$ alkyl or $C_6$–$C_{20}$ aryl, and

X is OH, $C_1$–$C_4$ alkoxy, $C_6$–$C_{20}$ aryloxy, $C_1$–$C_6$ acyloxy, or hydrogen, or a condensation product or partial condensation product thereof, (c) 0.1 to 30 wt. % of at least one emulsifier, and
   (d) 0 to 20 wt. % of one or more additives or auxiliary substances, with the proviso that the sum of components (a) to (d) totals 100 wt. %.

2. The suspension according to claim 1 wherein the silane corresponding to formula (II) is present.

3. The suspension according to claim 1 wherein the siloxane contains at least two structural units selected from $R_3SiO_{1/2}$, $R_2SiO_{2/2}$, and $RSiO_{3/2}$ units and optionally in addition $SiO_{4/2}$ units and/or condensation products and/or partial condensation products thereof.

4. The suspension according to claim 1 wherein the siloxane has a molecular weight of between 308 and 5,000.

5. The suspension according to claim 1 wherein the siloxane according to formula (III) is present.

6. A process for preparing the suspension according to claim 1 comprising adding components (b), (c) and optionally (d) to water (a) to form a mixture and emulsifying or dispersing said mixture.

7. A method for coating or impregnating a substrate comprising applying a suspension according to claim 1 the substrate.

* * * * *